(12) United States Patent  
Yang et al.

(10) Patent No.: US 7,242,401 B2
(45) Date of Patent: Jul. 10, 2007

(54) SYSTEM AND METHOD FOR FAST VOLUME RENDERING

(75) Inventors: Lining Yang, East Windsor, NJ (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 131 days.

(21) Appl. No.: 11/158,879

(22) Filed: Jun. 22, 2005

(65) Prior Publication Data

US 2005/0285858 A1 Dec. 29, 2005

Related U.S. Application Data

(60) Provisional application No. 60/582,983, filed on Jun. 25, 2004.

(51) Int. Cl.
*G06T 15/00* (2006.01)
(52) U.S. Cl. .................................... 345/420; 345/426
(58) Field of Classification Search ........ 345/420, 345/440, 503, 426, 422, 424
See application file for complete search history.

(56) References Cited

U.S. PATENT DOCUMENTS 6,587,110 B1* 7/2003 Kunimatsu et al. ......... 345/502
6,597,359 B1* 7/2003 Lathrop ...................... 345/440

* cited by examiner

*Primary Examiner*—Phu K. Nguyen
(74) *Attorney, Agent, or Firm*—Peter L. Kendall

(57) ABSTRACT

A method of propagating a ray through an image includes providing a digitized volumetric image comprising a plurality of intensities corresponding to a domain of voxels in a 3-dimensional space, providing a reduced path octree structure of said volumetric image, said reduced path octree comprising a plurality of first level nodes, wherein each first level node contains a plurality of said voxels, initializing a ray inside said volumetric image, and visiting each first level node along said ray, wherein if said first level node is non-empty, visiting each voxel contained within each first level node.

19 Claims, 7 Drawing Sheets

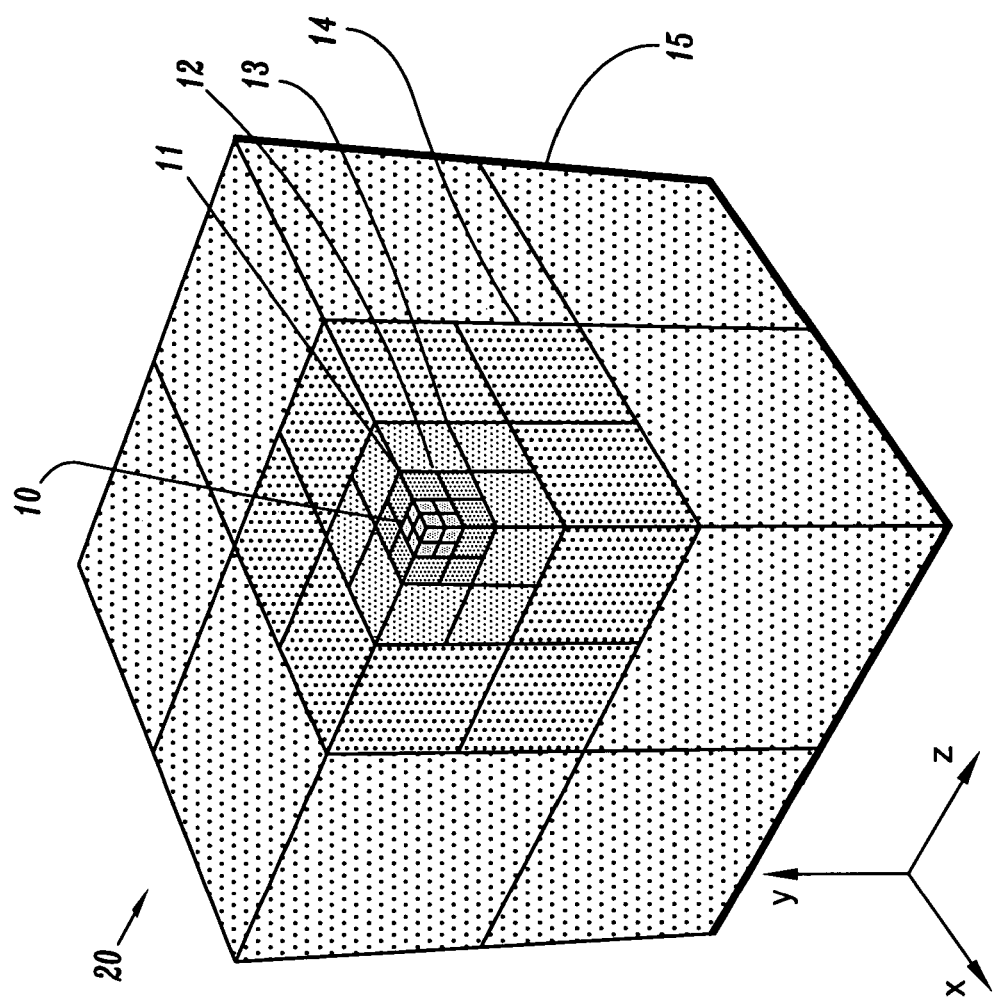
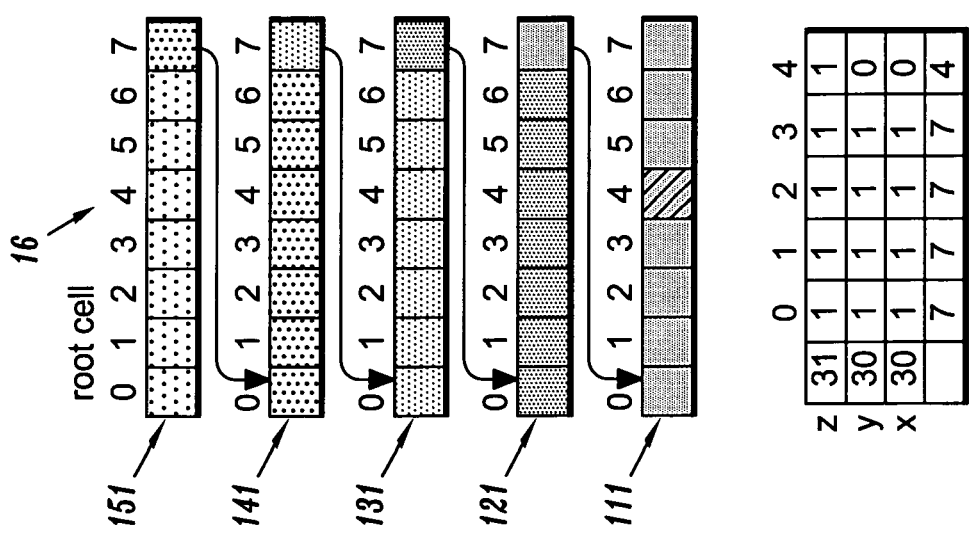
FIG. 1

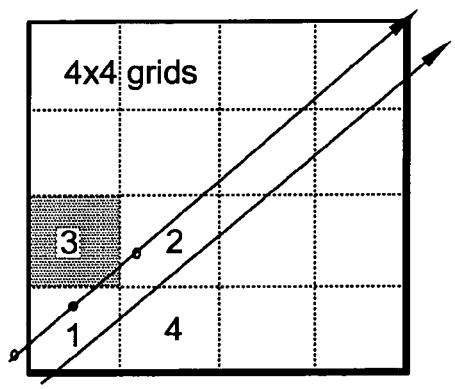
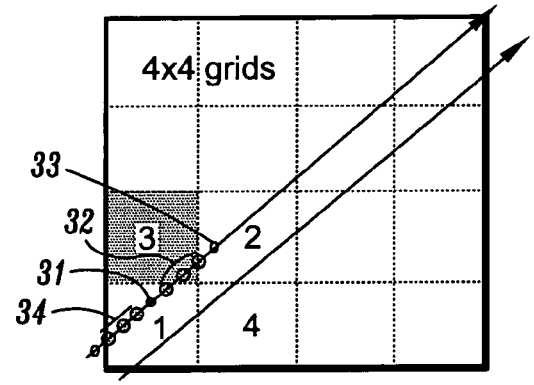
FIG. 3a  FIG. 3b
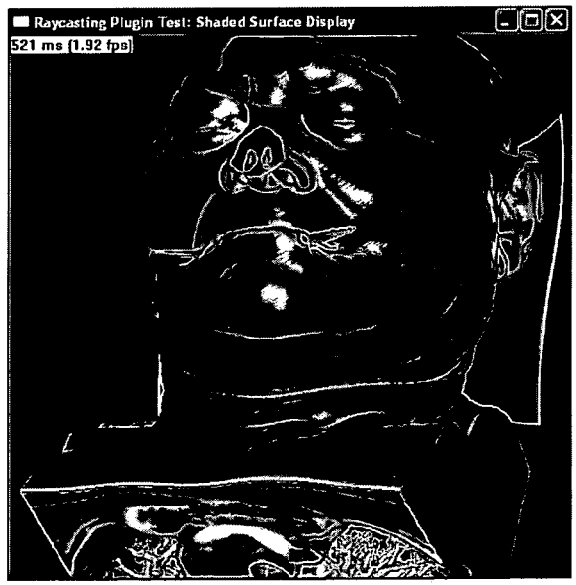
FIG. 4a  FIG. 4b

```
for each ray do
        sample = get_sample( node )
        store sample in pixel from which ray was cast
next ray get_sample ( node ) begin
        for each node do
                if node.sub !=null
                then
                        if empty (node)
                        then
                                sample=get_sample( node.sub)
                        end
                else
                        sample = trilinterp ( node)
                end
        next node
        return sample
end
```

FIG. 8

SYSTEM AND METHOD FOR FAST VOLUME RENDERING

CROSS REFERENCE TO RELATED UNITED STATES APPLICATIONS

This application claims priority from "Fast Volume Rendering Using a Reduced Path Octree and Multi-resolution Ray Marching Algorithms", U.S. Provisional Application No. 60/582,983 of Yang, et al., filed Jun. 25, 2004, the contents of which are incorporated herein by reference.

TECHNICAL FIELD

This invention is directed to volume rendering of a digital medical image.

DISCUSSION OF THE RELATED ART

With increased computation power and improved medical devices, the sizes of 3D volumetric datasets produced by various imaging modalities are expanding quickly. The Visible Human project from the National Library of Medicine produced datasets 512×512×1728 (864 MB), while the CT machine from Siemens Medical Solutions can generate datasets of size 512×512×2048 (1 GB). Interactivity can be quite helpful for medical professionals to diagnose diseases from such large datasets.

During the last decade, much effort has been directed to developing fast volume rendering techniques. Four popular techniques include ray-casting, splatting, shear-warp and 3D texture mapping. Among these technologies, ray-casting can generate the highest quality images and the associated algorithms scale well with the increase of the dataset size. However, interactivity is difficult to achieve using a brute-force approach to ray-casting due to intensive memory usage and the computational nature of these techniques.

Space leaping is a frequently used technique for accelerating ray-casting algorithms. Space leaping can allow the renderer to skip through empty regions without having to interpolate and blend samples from those regions. Many techniques that exploit skipping empty space introduce additional data structures such as an Octree or a Kd-Tree. Other techniques involve calculating a distance field and using it to skip empty space. Most of these methods suffer from either lengthy pre-processing every time the transfer function changes, complicated indexing schemes that reduce the run-time performance, or an increased memory footprint due to the extra data structures. These properties reduce the effectiveness of these space leaping techniques as applied to ray-casting based volume rendering.

SUMMARY OF THE INVENTION

Exemplary embodiments of the invention as described herein generally include methods and systems for volume rendering using a min-max reduced-path octree data structure and a multi-resolution ray marching algorithm to accelerate the direct volume rendering (DVR) and shaded surface display (SSD) rendering modes. The methods according to the embodiments herein disclosed have reduced indexing complexity and storage overhead as compared to a full octree structure, and can reach interactive rendering speed for large datasets that enable a user to change the transfer function on the fly without a lengthy pre-processing period.

According to an aspect of the invention, there is provided a method for propagating a ray through an image comprising providing a digitized volumetric image comprising a plurality of intensities corresponding to a domain of voxels in a 3-dimensional space, providing a reduced path octree structure of said volumetric image, said reduced path octree comprising a plurality of first level nodes, wherein each first level node contains a plurality of said voxels, initializing a ray inside said volumetric image, and visiting each first level node along said ray, wherein if said first level node is non-empty, visiting each voxel contained within each first level node.

According to a further aspect of the invention, visiting each voxel contained within each first level node comprises sampling each voxel intensity and compositing each said sample into a rendering of said image.

According to a further aspect of the invention, the octree further comprises a plurality of second level nodes, wherein each second level node comprises a plurality of adjacent first level nodes, and further comprising visiting each second level node along said ray, and if said second level node is non-empty, visiting each first level node contained in said non-empty second level node.

According to a further aspect of the invention, each node includes a minimum intensity value and a maximum intensity value of all voxels contained within said node.

According to a further aspect of the invention, a node is empty if said maximum intensity value for said node is less than a predetermined threshold value.

According to a further aspect of the invention, the method comprises counting the number of non-zero intensities in a node, wherein a node is empty if a minimum value of the number of said non-zero intensities is equal to the maximum number of said intensities.

According to a further aspect of the invention, the method comprises visiting all neighbor nodes of said first level node, and for each non-empty neighbor node, sampling each intensity contained within said neighbor node, and compositing each said sample into said rendering of said image.

According to a further aspect of the invention, the method comprises, if said first level node is empty, visiting all neighbor nodes of said first level node, and for each non-empty neighbor node, sampling the intensity of each voxel contained within said neighbor node, and compositing each said sample into said rendering of said image.

According to a further aspect of the invention, sampling an intensity comprises tri-linear interpolation.

According to a further aspect of the invention, each node includes a minimum intensity value and a maximum intensity value of all voxels contained within a one-voxel padding in each dimension in each neighbor about said node.

According to another aspect of the invention, there is provided a program storage device readable by a computer, tangibly embodying a program of instructions executable by the computer to perform the method steps for propagating a ray through an image.

BRIEF DESCRIPTION OF THE DRAWINGS

FIG. 1 is a schematic diagram of an exemplary octree data structure, according to an embodiment of the invention.

FIGS. 3a-b illustrate node leaking and how it can be avoided, according to an embodiment of the invention.

FIGS. 4a-b illustrate an example of an image both with and without node leaking, according to an embodiment of the invention.

FIG. 8 presents pseudo-code for an exemplary recursive implementation of a multi-resolution space leaping ray marching method according to an embodiment of the invention.

DETAILED DESCRIPTION OF THE PREFERRED EMBODIMENTS

Figure 2:
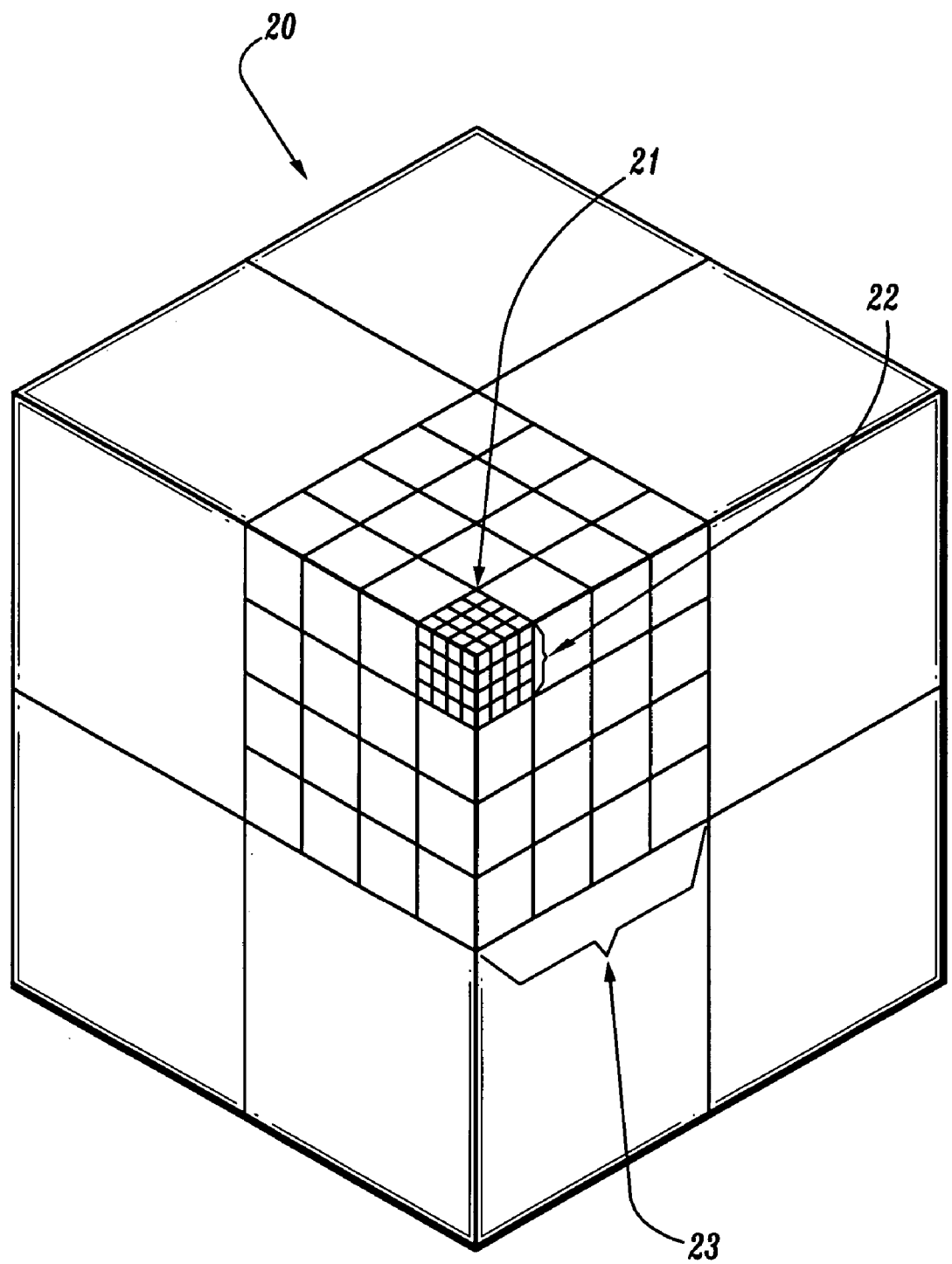
FIG. 2 is a schematic diagram of an exemplary reduced path octree data structure, according to an embodiment of the invention.

Exemplary embodiments of the invention as described herein generally include systems and methods for using a reduced-path octree data structure and a multi-resolution ray marching algorithm to perform fast volume rendering.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Ray casting is a process that, for each pixel in an image volume to be rendered, casts a single ray from the eye through the center of the pixel and into the volume, integrating optical properties, such as color and opacity, obtained from the encountered volume densities along the ray path. Two modes of ray casting are direct volume rendering DVR) and shaded surface display (SSD). In many imaging modalities, such as CT or MRI, the resulting intensity values or ranges of values can be correlated with specific types of tissue, enabling one to discriminate, for example, bone, muscle, flesh, and fat tissue, nerve fibers, blood vessels, organ walls, etc., based on the intensity ranges within the image. The raw intensity values in the image can serve as input to a transfer function whose output is an opacity or color value that can characterize the type of tissue. These opacity values can be used to define a look-up table where an opacity value that characterizes a particular type of tissue is associated with each pixel point. The optical properties being integrated by a ray can be obtained for a pixel from the look-up table. The use of opacity values to classify tissue enables a user to select an object or tissue type to be displayed and only integrate opacity values corresponding to the selected object or tissue.

An octree is a data structure used to efficiently traverse a 3D dataset. In one exemplary, non-limiting method of constructing an octree, each group of 8 adjacent voxels of a dataset are grouped into a first-level parent node. In a 512×512×512 dataset, one obtains 256×256×256 first level nodes of 2×2×2 . Then, each group of 8 adjacent first-level nodes are grouped into the next level parent node, etc. This process can be repeated until every voxel in the dataset has been so grouped, with the top level node forming the top of the octree structure. The top level node of an octree is referred to as the root node, which usually contains information about the entire dataset volume. Each intermediate layer node contains information about the nodes at the next lower level. During run-time ray casting, each ray is traced by traversing the octree first from the root node, if the root node indicates that it is empty, then the entire sub-volume is empty and nothing needs to be done. Otherwise, the ray traverses the nodes at the next lower level. This technique of skipping empty nodes and visiting the next lower level node if a parent node is non-empty is repeated until the ray visits an individual voxel, at which point the voxel is sampled via tri-linear interpolation.

A non-limiting example of an octree is depicted in FIG. 1. A dataset 20 is shown schematically in the figure. The dataset depicted in the figure comprises 32×32×32 voxels 10. Each group of 8 adjacent voxels 10 that form a 2×2×2 cube are grouped into a first level node 11. Each group of 8 adjacent first level nodes 11 that form a 2×2×2 cube of first level nodes are grouped into a second level node 12. Each group of 8 adjacent second level nodes 12 that form a 2×2×2 cube of second level nodes are grouped into a third level node 13. Similarly, each group of 8 adjacent third level nodes 13 that form a 2×2×2 cube of third level nodes are grouped into a fourth level node 14. Finally, the 8 adjacent fourth level nodes 14 form a 2×2×2 cube are grouped into a fifth level node 15. This fifth level node, being the top level for this dataset, forms the root node.

The left side of FIG. 1 represents how nodes in a given level of the octree refer to nodes in the next lower level. Five rows 16 are illustrated in the figure, one row for each level in the octree. Row 151 illustrates the 8 cells of the fifth level node 15, numbered from 0 to 7, and so forth for rows 141, 131, 121, and 111. Although each cell in row 151 points to 8 lower level nodes, for the sake of clarity in the drawing, the this is depicted only for cell 7 in the diagram. Cell 7 of row 151 is shown pointing to the first of 8 fourth level nodes in row 141. Similarly, each cell in row 141 points to 8 lower level nodes, and this is indicated by cell 7 of row 141 pointing to the first of 8 third level nodes 131. Cell 7 of row 131 is shown pointing to the first of 8 second level nodes 121, and cell 7 of row 121 is shown pointing to 8 first level nodes 111. In this manner, one can traverse from the root node 15 through each lower level node until one reaches individual voxels 10.

Although the octree data structure is efficient in encoding information about the empty space, there are several aspects of concern. First, it has a relatively complex indexing scheme that will impose performance overheads during run-time. For example, to render a 512×512×512 dataset, a ray needs to go down through 9 layers of octree nodes before reaching individual non-empty voxels to perform interpolation. Second, an octree needs additional memory to store the information associated with each lower level node. With datasets increasing in size, memory resources can be quite valuable and any additional overhead needs to be carefully evaluated. Last, each time a user wants to change the transfer function, the octree should be reconstructed to re-encode the empty space. When taking into account the complexity of the octree data structure, re-encoding the empty space can impose undesirable pre-processing.

According to an embodiment of the invention, a reduced path octree data structure is depicted in FIG. 2. In a reduced path octree, the number of intermediate layers have been reduced. The non-limiting example depicted in FIG. 2 is a two layer octree having a lower level with 4×4×4 nodes and an upper level with 16×16×16 nodes. Each 433 4×4 node 22 is associated with a list of the 64 voxels 21 contained therein, while each 16×16×16 node 23 is associated with the 64 4×4×4 nodes 22 contained therein. The entire image volume 20 comprises 2×2×2 nodes 23 of size 16×16×16. Associated with each node at each level is a minimum and maximum value of all the nodes/voxels contained within the node. Reducing the number of intermediate layers reduces the additional memory needed by the data structure, and reduces the complexity of the indexing. Each layer can be treated as a sub-sampled volume and the indexing relationship between different layers for the corresponding nodes is implicit with no additional required pointers. For example, considering a 512×512×512 cube dataset and a voxel with the (x, y, z) position being (240, 36, 410), the corresponding node location in the 4×4×4 layer is (60, 9, 103) and the corresponding node location in the 16×16×16 layer is (15, 3, 26). Note that the division by 4 with truncation can be efficiently computed via right shifting by two bits. More generally, the conversion of an upper level index to a lower level index can by accomplished by right shifting the upper level index by an appropriate number of bits.

The octree structure depends on the transfer function to determine which nodes are empty. Thus, changing the transfer function requires the octree data structure to be recomputed, which can introduce a noticeable delay during run-time. According to another embodiment of the invention, to shorten this delay, a min-max structure can be incorporated into the octree structure. Instead of storing whether or not a node is empty, the minimum and maximum value of all the voxels contained within a node is stored. This data structure can be constructed the first time an image volume is loaded, and need not be updated when the transfer function changes.

According to an embodiment of the invention, a min-max structure can be used during DVR to determine the "emptiness" of a node during the run time when used with another data structure referred to as the alpha summed area table. Equation 1 defines how to construct an alpha summed area table for each entry, where lut[i].alpha represents the look-up-table opacity value for the $i^{th}$ voxel.

$$lutsum[n] = \sum_{i=0}^{n} (lut[i]alpha \neq 0) \quad (1)$$

The emptiness of a node can be determined by comparing the table entry of the maximum value and the table entry of the minimum value to see if they are equal. If the table entries have the same value, the node is said to be empty, as are all voxels contained within this node. Equation 2 illustrates an example of determining whether or not a node is empty.

$$if\ ((lutsum[530]-lutsum[15])=0) \quad (2)$$

In the example of equation 2, the minimum and maximum values of the node are 15 and 530, respectively. Compared to the original volume data and the reduced path octree data structure, the alpha summed area table is small in size and easy to compute. For example, a typical alpha summed area table for 16×16×16 node has only 4096 entries. Since the calculation of the table as shown in Equation 1 is incremental, the update of the table is very fast. Thus, each time the transfer function changes, only the alpha summed area table needs to be updated, instead of reconstructing the reduced path octree. The update of the table can be performed in milliseconds and is not noticeable to an end user.

According to another embodiment of the invention, a min-max reduced path octree data structure can be used for SSD by using a threshold to determine a surface. During the run-time, this threshold is compared against the min-max value of a node. If the maximum value of a node falls below the threshold, all voxels within this node are skipped.

According to another embodiment of the invention, there is provided a multi-resolution space-leaping algorithm that uses adaptive step sizes. For the purpose of simplifying the discussion herein, a non-limiting example having two octree levels, 16×16×16 and 4×4×4, and a rendering sample distance the ray set to the voxel distance, a unit step size, is used. It is to be understood, however, that this octree structure and sampling distance are exemplary, and an octree structures with a different node structure and a different sampling distances can be used and be within the scope of an embodiment of the invention.

Figure 5:
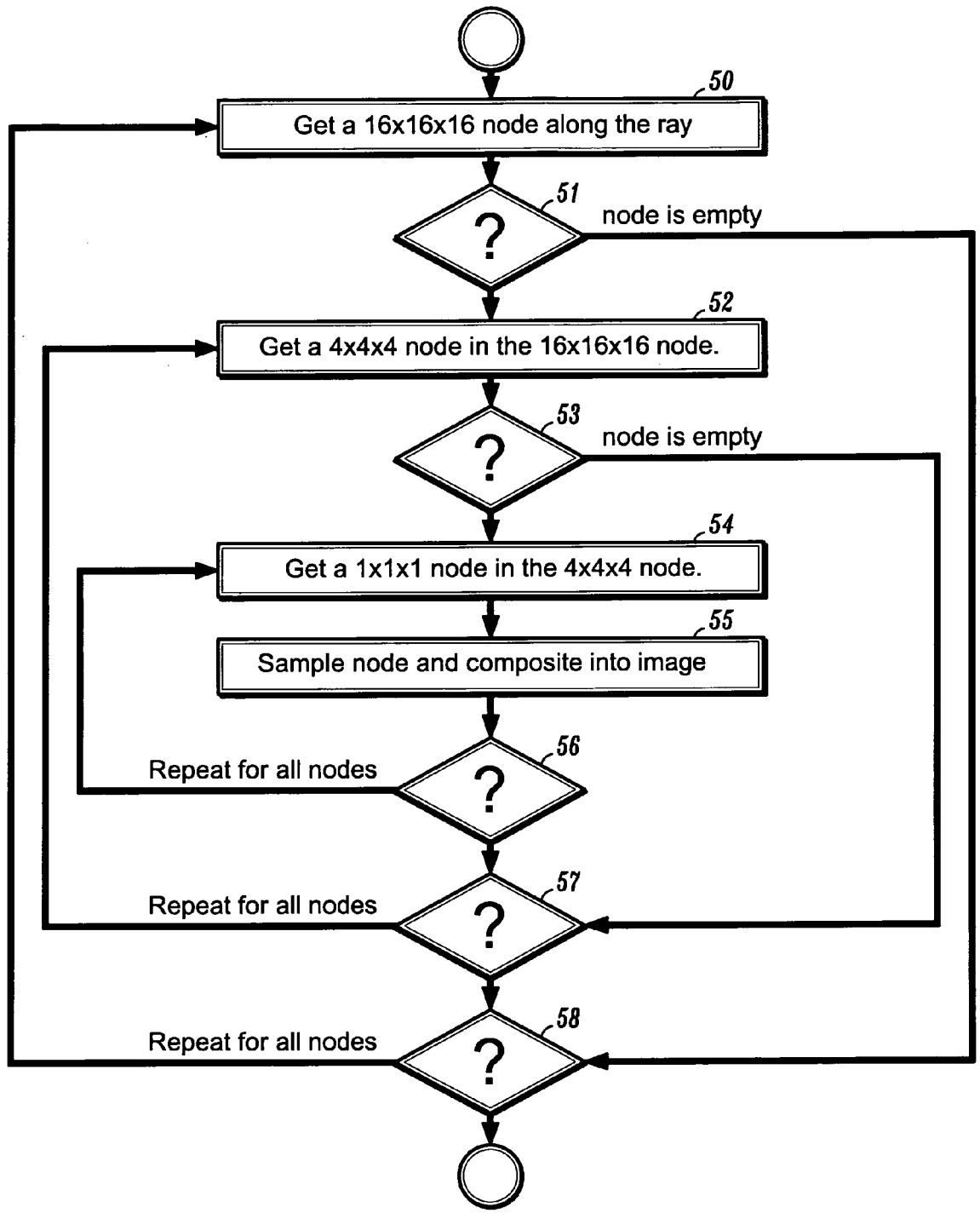
FIG. 5 is a flow chart of a multi-resolution space leaping ray marching method according to an embodiment of the invention.

FIG. 5 is a flow chart of a multi-resolution space leaping ray marching method according to an embodiment of the invention. In a non-limiting example described herein, a mill-max reduced path octree structure that includes two levels, 4×4×4 and 16×16×16, is used. The ray starts at the first 16×16×16 node at step 50 with a ray increment of 16. If, at step 51, the node is empty, it can be skipped. The process jumps to step 58 to advance to the next 16×16×16 node. If the 16×16×16 node is not empty, then a first level lower node, such as the 4×4×4 level node within the parent 16×16×16 node, is visited at step 52, and the ray increment size is reduced to four. Again, if at step 53, the node is empty, it can be skipped. The process jumps to step 57 to advance to the next 4×4×4 node. If the 4×4×4 node is not empty, then a next level lower node, such as the 1×1×1 level nodes within the parent 4×4×4 node, is visited at step 54, and the ray increment size is reduced to one. At step 55, the node is sampled and composited into the image. One common sampling technique is tri-linear interpolation. At step 56, the next 1×1×1 node is visited until all 1×1×1 nodes in the 4×4×4 node have been visited. The ray increment size is now increased back to four and the next 4×4×4 node is visited at step 57, and the preceding steps 53, 54, 55, and 56 are repeated. After all the 4×4×4 nodes within the specific 16×16×16 node are processed, the ray increment size is increased to sixteen and the next 16×16×16 node is visited at step 58. The preceding steps 51 to 57 are repeated until the ray exits the volume. Again, during the examination of a node, the emptiness of the node for DVR is determined by the difference of the alpha summed area entries for the minimum and maximum values stored in that node. The emptiness of the node for SSD is determined by whether the maximum value stored in the node is larger than the predefined threshold value.

Compared to a space-leaping algorithm lacking a hierarchical data structure, a method according to an embodiment of the invention can perform up to 10 times faster. This is because a ray marches at 4-16 times the step size of a non-space-leaping ray marching step, which reduces the number of memory accesses for the voxels along the ray, which in turn reduces the cache misses as well as time-consuming tri-linear interpolations. According to this embodiment of the invention, empty space can be skipped efficiently without introducing unnecessary extra memory or complicated indexing. A user can change the transfer function on the fly without noticeable processing delays.

The use of a two-level min-max reduced path octree in FIG. 5 is exemplary, and according to another embodiment of the invention, an octree structures with an arbitrary number of levels can be used. FIG. 8 depicts pseudo-code for an exemplary, non-limiting recursive implementation of a multi-resolution space leaping ray marching method according to this embodiment of the invention. For each ray, a recursive function get_sample is invoked with the current node as an argument, to composite the image value for that ray. For each non-empty node, the next lower level node, indicated as node.sub in the pseudo-code, is visited until the lowest level nodes are reached, at which point each of the lowest level nodes are sampled, typically using trilinear interpolation, and the samples are composited into the image.

Similarly, according to another embodiment of the invention, an octree with one level can be used. In this embodiment, the outermost node loop depicted in FIG. 5 would be eliminated, and each unit sized node would be sampled if an outer level node is not empty. 5 However, a traversing scheme according to an embodiment of the invention as described above can cause node-leaking. FIG. 3(a) shows an example of node-leaking. For reasons of clarity, FIGS. 3a-b show an exemplary, non-limiting 4×4 level octree node. Node-leaking arises from increasing the ray step size during the run time. Referring now to FIG. 3a, during the marching of a ray, node 1 is empty, and the ray is advanced by a step size of 4 and reaches node 2. After examination, node 2 is found to be empty and the ray is advanced without sampling the voxels within these two nodes. However, node 3 is not empty. If the ray is advanced with unit step size, at least two voxels (in red) can be found in node 3 that are not empty. With the step size set to be larger than the unit step size, this node that should have been sampled was skipped. The artifacts caused by node-leaking are more visible in shaded and SSD rendering modes. FIG. 4a shows an example image illustrating the effect of node-leaking in SSD mode, as indicated by the plurality of black spots visible on the— subjects face.

According to an embodiment of the invention, to address node-leaking, additional steps can be included with the ray marching procedure described above, in which neighboring nodes are checked in all dimensions. Referring again to FIG. 3b, node 1 is empty while node 3 is not. Using the methods of the embodiments described above, the ray will skip node 3 and go directly into node 2. In order to avoid this phenomenon, the emptiness of node 1 and its neighboring nodes, node 3 and 4, should be checked.

Figure 6:
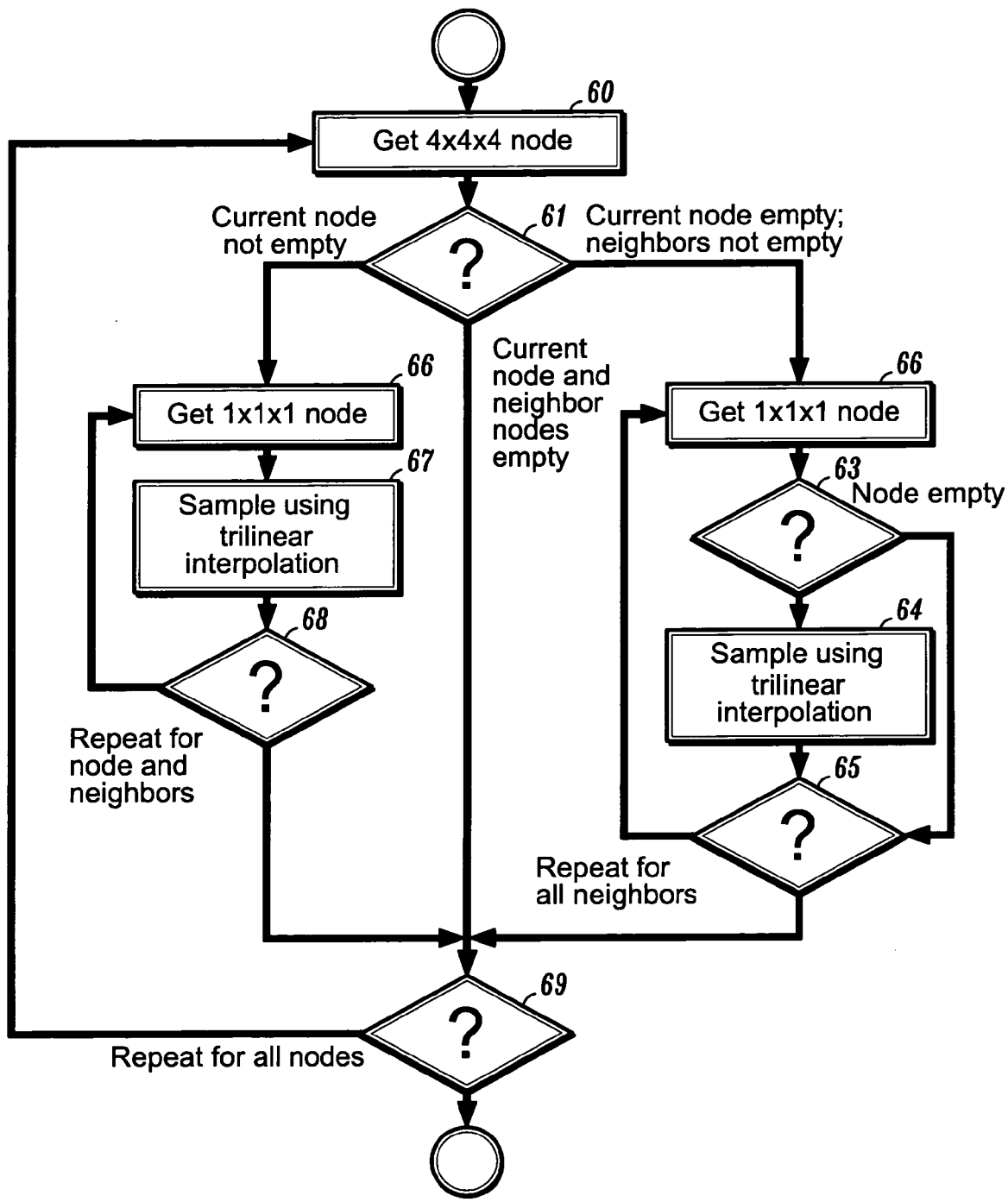
FIG. 6 is a flow chart of a method for avoiding node leaks, according to an embodiment of the invention.

FIG. 6 is a flow chart of a method for avoiding node-leaking, according to an embodiment of the invention. For simplicity, an exemplary one-level 4×4 octree as depicted in FIGS. 3a-b is used for FIG. 6. Starting at step 60, each 4×4 node along a ray is visited, and the current node and each of its neighbor nodes is checked for emptiness at step 61. In general, three cases present themselves.

(1) The current node and each of its neighbor nodes are empty. In this case, the process can skip the current node and go to step 69 to advance to the next node.

(2) The current node is empty while at least one neighbor node is not empty. In this case, the ray increment step size is reduced from 4 to 1, and a 1×1 node containing the ray front is obtained at step 62. The emptiness of the neighbor node in the ray advancing direction is checked at step 63 for all voxels in the node. There are two possible sub cases here. First, if a voxel is in an empty node, that voxel is skipped, the ray front is advanced by one step at step 65 and the next node is obtained at step 62. Otherwise, if the voxel is not in an empty node, it is sampled, typically using tri-linear interpolation, at step 64, after which the ray front is advanced by one step at step 65 and the next node is obtained at step 62. In FIG. 3b, the neighbors are nodes 3 and 4, and the voxels start from voxel 31 in the current node and the next three voxels 32. In FIG. 3b, voxel 31 and the first of voxels 32 are in node 1 which is empty, while the second and third voxels 32 are in node 3, which is not empty.

(3) The current node is not empty. In this case, the ray increment step size is reduced from 4 to 1, and a 1×1 node is visited at step 66 and sampled at step 67, typically using tri-linear interpolation. The next 1×1 node is obtained at step 68 until all such nodes have been visited. Note that when the node is sampled in this case, all the voxels in the node should be sampled. Sometimes this requires a step back with unit step size to sample those skipped voxels. For example, referring to FIG. 3b, the sampling should include the original voxel 31, three skipped voxels 34, and one next sample 32 in node 1, with unit step size.

After all 1×1 nodes have been visited in a 4×4 node, the next 4×4 is obtained at step 69 until all such nodes have been visited. For an octree with more than one level, the above steps can be repeated for each node at each different octree level.

In case (1) the operational overhead are minimal, and the ray can quickly advance with step size 16 and/or 4 for the given example. Case (1) should occur most often as a ray traverses empty space. It can provide a 4-16 times improvement in performance.

In case (2), the operational overhead is still low for checking the node emptiness with a unit step size. If node sizes are powers of two, rounding from a unit sample index to a node index can be efficiently computed via right shifting the unit index by the appropriate number of bits. In the exemplary case depicted in FIG. 3b, where a 4×4 node is illustrated, the node-index can be computed by right shifting the indices by two bits. Unless a node is not empty, which can occur when a ray passes near a non-empty object, there is no need to use tri-linear interpolation to resample the node.

Case (3) is the more computationally intensive than cases (1) and (2), since tri-linear interpolation is typically used to resample the node along the ray. No space leaping or skipping can be used until the ray either passes out of the non-empty space or the opacity of the rendering reaches a threshold, in which case the ray marching is terminated.

Another situation in which node-leaking can occur is when a ray is near the boundary of a node. In that case resampling with tri-linear interpolation will use 8 neighboring voxels that are located in separate nodes. The sample value cannot be determined from the emptiness of the node containing the sample, but needs the information of voxels from other nodes as well. To avoid this situation, during the construction of a lower level k×k×k node of the octree, the minimum and maximum of (k+1)×(k+1)×(k+1) voxels are used. That is, a padding of one voxel in each dimension is introduced that overlaps with neighboring nodes when computing the minimum and maximum of the node. This padding can ensure that any sample near a k×k×k node boundary can take account of any neighboring voxel that can contribute to the sample value.

FIGS. 4a-b illustrate an example of an image both with and without node leaking, according to an embodiment of the invention. The image depicted in FIG. 4a illustrates the effect of node-leaking, while the image in FIG. 4b depicts an image rendered without node leaking. The rendering time for the example is indicated on the upper left corner of each image. Each image was rendered from a 512×512×512 CT head dataset, and the time to render was 459 ms/frame using a ray marching with node-leaking, while the time to render the same image correcting for node-leaking was 521 ms/frame.

A method according to an embodiment of the invention was tested using three datasets: a 512×512×1024 visible female dataset, a 512×512×512 CT head dataset, and a 512×512×512 abdominal dataset. The test platform was a dual Xeon 3 GHZ computer with one gigabyte of memory. For DVR mode at full resolution 2-4 frames per second was achieved for the head and abdominal datasets, and about 0.5-2 frames per second was achieved using the visible female dataset. The rendering performance for SSD was about 1-3 frames per second for the head and abdominal datasets and about 0.5-1 frames per second using the visible female dataset. A method according to an embodiment of the invention can be up to 10 times faster, without graphics hardware acceleration, than a space leaping approach lacking a hierarchical data structure. In addition, a method according to an embodiment of the invention can utilize about 20-30 times less memory compared to the original octree algorithm.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
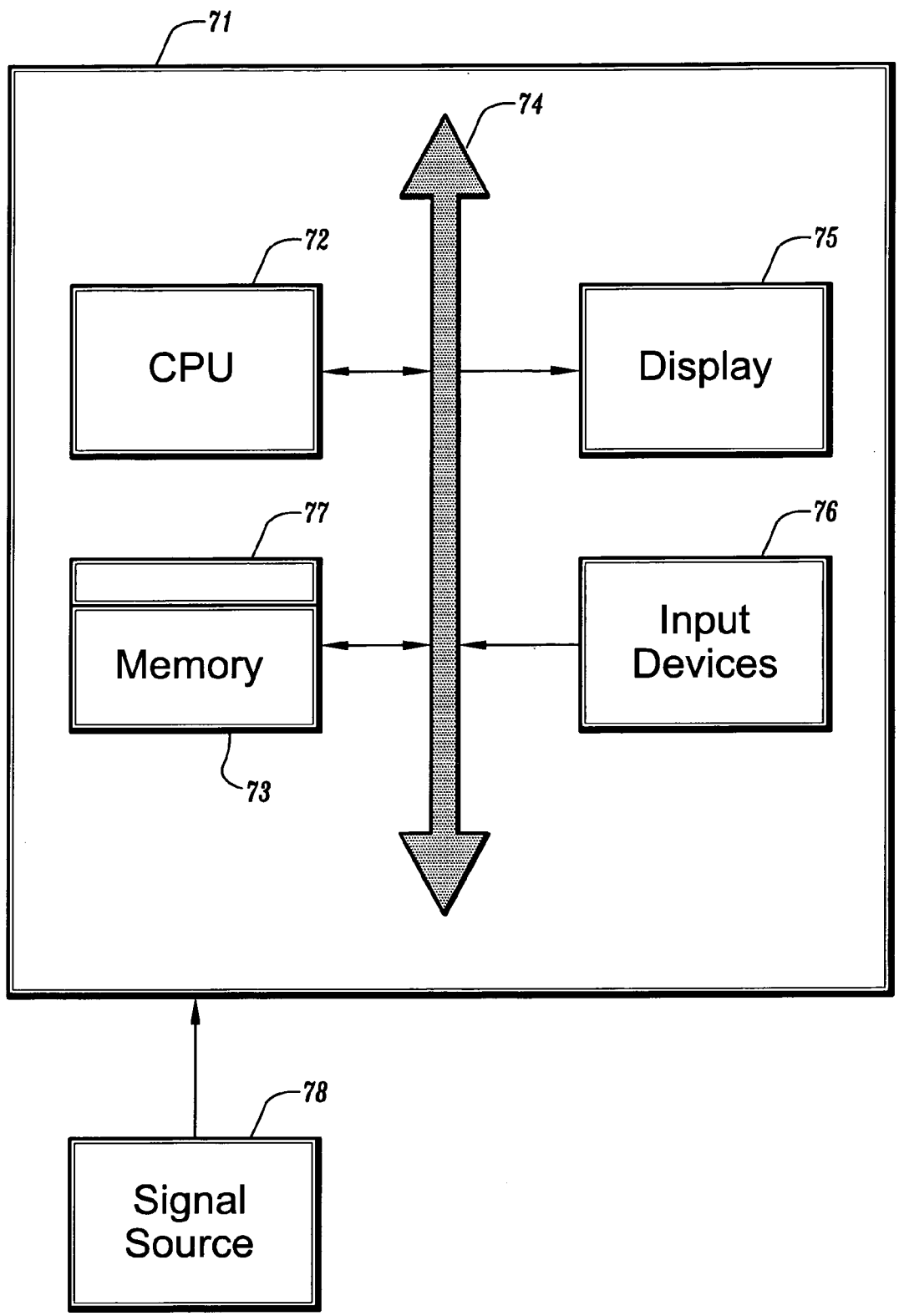
FIG. 7 is a block diagram of an exemplary computer system for implementing a multi-resolution space leaping ray marching method, according to an embodiment of the invention.

Referring now to FIG. 7, according to an embodiment of the present invention, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for performing volume rendering, comprising:
   providing a digitized volumetric comprising a plurality of intensities corresponding to a domain of voxels in a 3-dimensional space and a color/alpha channel lookup table;
   performing a pre-processing step, said preprocessing step comprising at least one of constructing a Reduced Path Octree data structure and creating a summed area table of said alpha channel of the lookup table;
   generating a 2-D image by casting a ray from each pixel of the image into the volume;
   visiting each level of the Reduced Path Octree node and determining the emptiness of nodes at each level during the advancing of said ray;
   sampling along the ray inside the non-empty region.

2. The method of claim 1, wherein said Reduced Path Octree comprises a plurality of levels.

3. The method of claim 1, wherein said Reduced Path Octree includes a predetermined number of levels of a full octree.

4. The method of claim 1, wherein said Reduced Path Octree levels are determined based on a user specified memory consumption limit.

5. The method of claim 4, wherein said Reduced Path Octree levels are determined by a balancing of an efficiency of indexing and an efficiency of an adaptive sampling to improve rendering performance.

6. The method of claim 1, wherein at each level each octree node of the reduced path octree includes at least one attribute comprising a Minimum value, a Maximum, a Variance value, and a Gradient value which are calculated using all voxels covered by said node.

7. The method of claim 6, wherein each node's attributes are calculated using the intensities associated with the node and one-extra-voxel of thickness of padding along all three dimensions to avoid skipping a partial empty node in error.

8. The method of claim 1, wherein each element of the summed area table is calculated by summation of alpha values of all entries with indices smaller than the element.

9. The method of claim 1, wherein visiting an octree node of the reduced path octree comprises shifting a pre-determined number of bits from a volume index according to the level of the octree node.

10. The method of claim 1, further comprising an adaptive ray sampling algorithm using the Reduced Path Octree.

11. The method of claim 10, further comprising:
    visiting each nth level Reduced Path Octree node along said ray, wherein a step size of the ray sampling corresponds to a size of the node of the nth level Reduced path Octree;

visiting each lower level node contained therein along said ray if the nth level node is not empty and reducing the sampling step size to the size of the node;

repeating the steps of visiting each next lower level and changing the sampling step size accordingly until a voxel level is reached; and interpolating each sample and compositing the sample into a rendering of an image.

12. The method of claim 11, wherein a node is empty if said maximum value of said node is less than a predetermined threshold value.

13. The method of claim 11, wherein a node is empty if a difference of a summed area table entry of a minimum value of said node and the summed area table entry of a maximum value of said node is substantially the same.

14. The method of claim 11, wherein visiting each nth level Reduced Path Octree node further comprises determining the emptiness of a current node and its neighboring nodes to avoid skipping a non-empty neighboring node using a larger than unit step size.

15. The method of claim 11, wherein visiting each nth level Reduced Path Octree node further comprises advancing the ray using the step size corresponding to said level, if neighboring nodes and a current node are empty.

16. The method of claim 11, further comprising visiting the node in a next lower level and reducing the ray step size corresponding to the next lower level, if the current node is not empty.

17. The method of claim 16, further comprising interpolating and compositing the samples along said ray if the next lower level is at the voxel level.

18. The method of claim 11, further comprising visiting the node in the next lower level and reducing the ray step size corresponding to the next lower level, if a current node is empty and the neighbor nodes are not empty.

19. The method of claim 18, further comprising looping through the node using said ray step size without interpolating and compositing if the next lower level is at the voxel level, until the ray exits the node.

* * * * *